United States Patent [19]

Napierala

[11] 4,208,150
[45] Jun. 17, 1980

[54] QUICK RELEASE CLUTCH COUPLING

[75] Inventor: Günter Napierala, Essen, Fed. Rep. of Germany

[73] Assignee: Gelenkwellenbau GmbH, Essen, Fed. Rep. of Germany

[21] Appl. No.: 897,125

[22] Filed: Apr. 17, 1978

[30] Foreign Application Priority Data

May 13, 1977 [DE] Fed. Rep. of Germany ....... 2721558

[51] Int. Cl.² .............................................. F16D 1/02
[52] U.S. Cl. .................................. 403/338; 192/67 R; 403/364
[58] Field of Search ................... 64/9 R, 9 A, 6, 67 R; 192/114 T, 93 C, 78; 403/364, 335, 336, 338

[56] References Cited

U.S. PATENT DOCUMENTS

| | | | |
|---|---|---|---|
| 1,145,489 | 7/1915 | Kennedy | 64/9 R |
| 1,868,040 | 7/1932 | Wise | 192/78 |

FOREIGN PATENT DOCUMENTS

| | | | |
|---|---|---|---|
| 358162 | 1/1921 | Fed. Rep. of Germany | 64/9 R |
| 359466 | 1/1921 | Fed. Rep. of Germany | 64/9 R |
| 1202074 | 9/1965 | Fed. Rep. of Germany | |
| 137510 | 1/1920 | United Kingdom | 192/78 |

Primary Examiner—Rodney H. Bonck
Attorney, Agent, or Firm—Toren, McGeady and Stanger

[57] ABSTRACT

A quick release clutch coupling for coupling two flanges between which torque is transmitted. Each flange carries a pair of axially extending clutch elements, each of which has bearing surfaces so that the clutch elements of opposite facing flanges engage each other along the bearing surfaces for the transmission of torque from one flange to the other. The engaged bearing surfaces of each clutch element lie in a plane which passes through the axis of rotation of the coupling. A bolt, which has oppositely pitched threads, is mounted for rotational movement by a guide on the coupling, and the axis of rotation of the bolt extends in a direction transverse to the axis of the coupling. A pair of tension shoes are carried on the bolt for displacement in opposite radial directions upon rotation of the bolt for preventing axial displacement of one coupling flange with respect to the other. Each clutch element has a further bearing face which bears against one of the tension shoes. The tension shoes are configured such that the distance between these bearing faces and the longitudinal axis of the bolt decreases in a direction extending radially away from the center of the coupling.

5 Claims, 11 Drawing Figures

QUICK RELEASE CLUTCH COUPLING

BACKGROUND OF THE INVENTION

The present invention relates generally to torque transmitting systems, and more particularly to a quick release coupling for a pair of coupling flanges which are rotationally connected for transmitting torque from one coupling flange to the other by means of axially extending dogs, or clutch elements, and which coupling flanges are prevented from axial displacement relative to each other by tension shoes which are carried for opposite radial displacement on a bolt having oppositely pitched threads mounted on the coupling and extending in a direction transverse to the axis of rotation of the coupling.

Couplings of this type are known in the art, see for example German PS No. 1 202 074. However, the flanges of such couplings tend to disengage from each other during operation. This is a result of the fact that gear teeth having inclined sides are used for transmitting the torque from one flange to the other. The force needed to transmit the torque from one flange to the other therefore has two components. One acts at right angles to the inclined surfaces of the torque transmitting teeth and the other acts in an axial direction. In this type of coupling, the axially directed force tends to force the couplings apart and must therefore be absorbed by tension shoes to prevent the axial displacement of one flange with respect to the other. The cooperating faces on the tension shoes and on the coupling flanges are also inclined surfaces and therefore the axially directed force is again split into two components. The resultant force acts in a direction normal to the cooperating surfaces between the tension shoes and the coupling flanges, and a second component acts on the threads of the bolt which carries the tension shoes and an associated thrust spring. When this type of coupling is in operation, there is a significant tendency for the coupling flanges to disengage because the tension shoes tend to be forced radially inwards so that the torque transmitting teeth are forced axially apart.

It is accordingly the principal object of the present invention to overcome the foregoing disadvantages and to provide a quick release clutch coupling having dogs, or clutch elements, which are used for transmitting torque between one coupling flange and another coupling flange, and tension shoes which cooperate in such a manner as to prevent undesired disengagement of the coupling flanges.

It is a further object of the present invention to provide a quick release clutch coupling of the foregoing described type having tension shoes which are configured such that the distance between the bearing faces of the clutch elements on each coupling flange which engages the tension shoes and the longitudinal axis of the bolt which carries the tension shoes decreases in a direction extending radially away from the center of the coupling.

Yet, a further object of the present invention is to provide a quick release coupling which can be simply and inexpensively fabricated.

Other objects of the present invention will become more apparent from the description of the invention in connection with the accompanying drawings, which will be described more fully hereinafter.

SUMMARY OF THE INVENTION

The foregoing objects of the present invention are generally accomplished by providing a pair of axially extending clutch elements on each of the coupling flanges, each of which has bearing surfaces so that the clutch elements of each flange engage each other along the bearing surfaces for the transmission of torque from one flange to the other. The bearing surfaces of each clutch element, which engage each other, lie in a plane which passes through the axis of rotation of the coupling. A bolt, which has oppositely pitched threads, is mounted for rotational movement by a guide on the coupling, and the axis of rotation of the bolt extends in a direction transverse to the axis of the coupling. A pair of tension shoes are carried on the bolt for displacement in opposite radial directions upon rotation of the bolt for preventing axial displacement of one coupling flange with respect to the other. Each clutch element has a further bearing face which bears against one of the tension shoes. The tension shoes are configured such that the distance between these bearing faces and the longitudinal axis of the bolt decreases in a direction extending radially away from the center of the coupling.

The advantage of the foregoing arrangement is that each flange simply has two axially extending clutch elements which have cooperating bearing surfaces that lie in a plane passing through the center of the coupling. The orientation of the bearing surfaces lying in such a plane ensures that the circumferential force required for transmitting torque from one flange to the other acts solely in a direction normal to the bearing surfaces, i.e. a tangential force corresponding to the tangent at the point of contact between the two flanges. As a result, there will be no undesirable components of this force which might tend to cause disengagement of the flanges. The coupling flanges are tensioned together by means of the tension shoes which are mounted on the bolt. In accordance with the present invention, the cooperating bearing faces between the clutch elements on the coupling flanges and the tension shoes are selected such that the force which is transmitted between a clutch element and a tension shoe is split into a component which is circumferentially directed and a component which is radially directed along the axis of the bolt. This radial component therefore prevents disengagement of the tension shoe since it is directed opposite to the direction of disengagement.

According to one embodiment of the present invention, the tension shoes have a parallelogram shaped cross sectional configuration with the side faces thereof which are engaged by the bearing faces of the clutch elements extending in a direction at an angle which is less than 90° with respect to the axis of rotation of the coupling.

This configuration produces significant advantages since the tension shoe will engage a clutch element of a flange in the circumferential direction in such a manner that an angle of less than 90° will be included between the bearing face of the clutch element and the longitudinal axis of the coupling. The circumferential force acting at this point will therefore be split into a resultant force acting normal to the bearing face, and a component acting in an axial direction of the coupling toward the other flange to thereby oppose flange disengagement.

In another embodiment of the invention, the tension shoes have a pyramidal configuration the side faces of which include at least one face which is inclined at an angle of less than 90° with respect to the axis of rotation of the coupling, and another face which is oppositely symmetrical thereto.

This configuration is particularly advantageous when it is desired that there should be no axial forces during operation. This configuration also ensures that although the circumferential force is split into components, those component forces which are effective in the axial direction will cancel each other out, but the components tending to oppose disengagement of the tension shoes will be preserved so that the advantages remain intact.

In yet another embodiment of the present invention, which is also intended to avoid forces which act in an axial direction of the coupling, the tension shoes are conical having inclined conical faces which are engaged by the bearing faces of the clutch elements and which extend arcuately in the direction of the center axis with the generating radius situated on the bolt axis.

As a result of this configuration of the operative surfaces, any undesired disengagement of the coupling is fully prevented because the various forces acting on the coupling flanges prevent axial displacement of one flange with respect to the other.

BRIEF DESCRIPTION OF THE DRAWINGS

Preferred embodiments of the present invention will be described hereinafter in connection with the accompanying drawings, in which.

DESCRIPTION OF THE INVENTION

Figure 1:
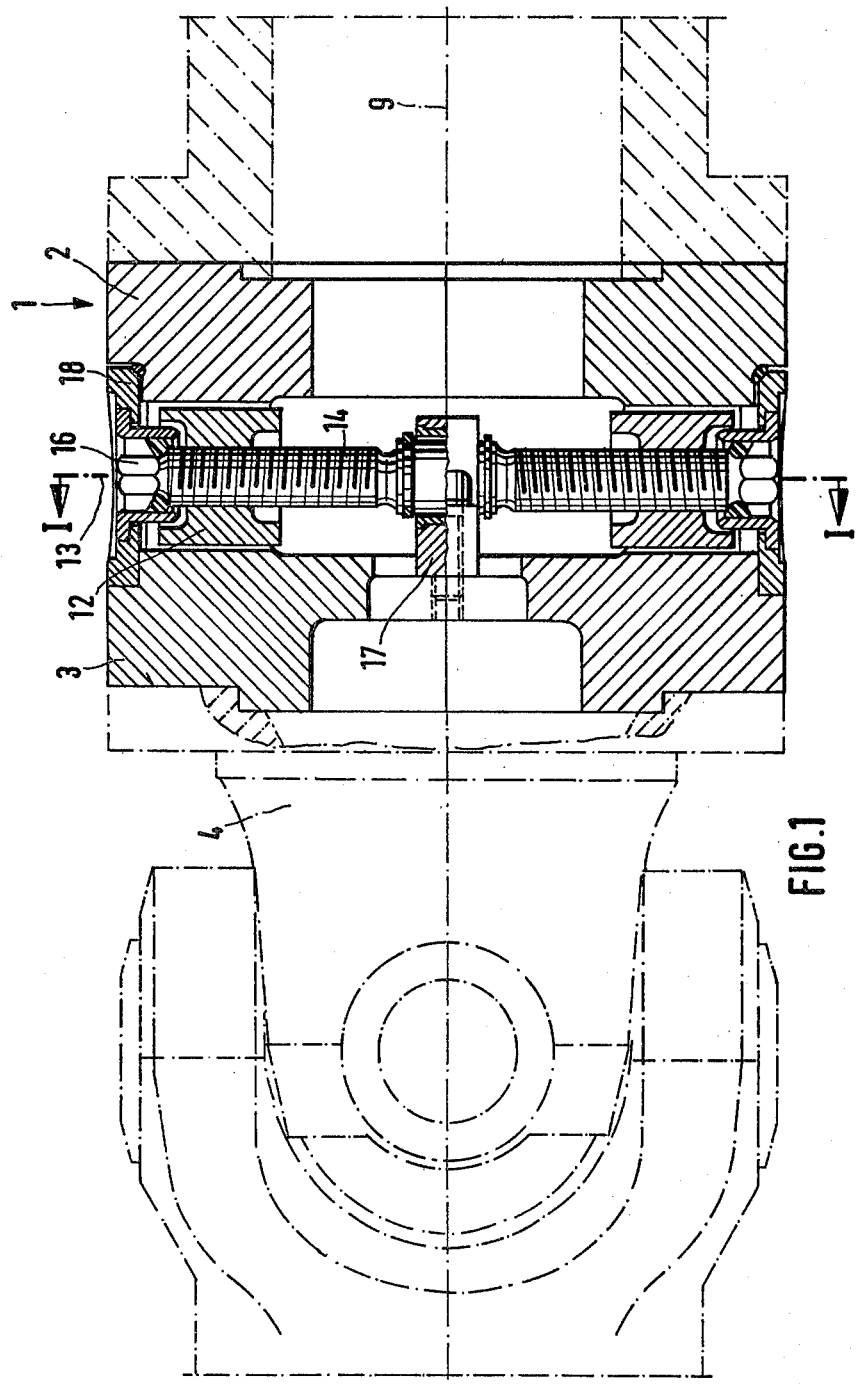
FIG. 1 is a longitudinal sectional view of the quick release coupling of the present invention and illustrating driving and driven members associated with the coupling.
Figure 2:
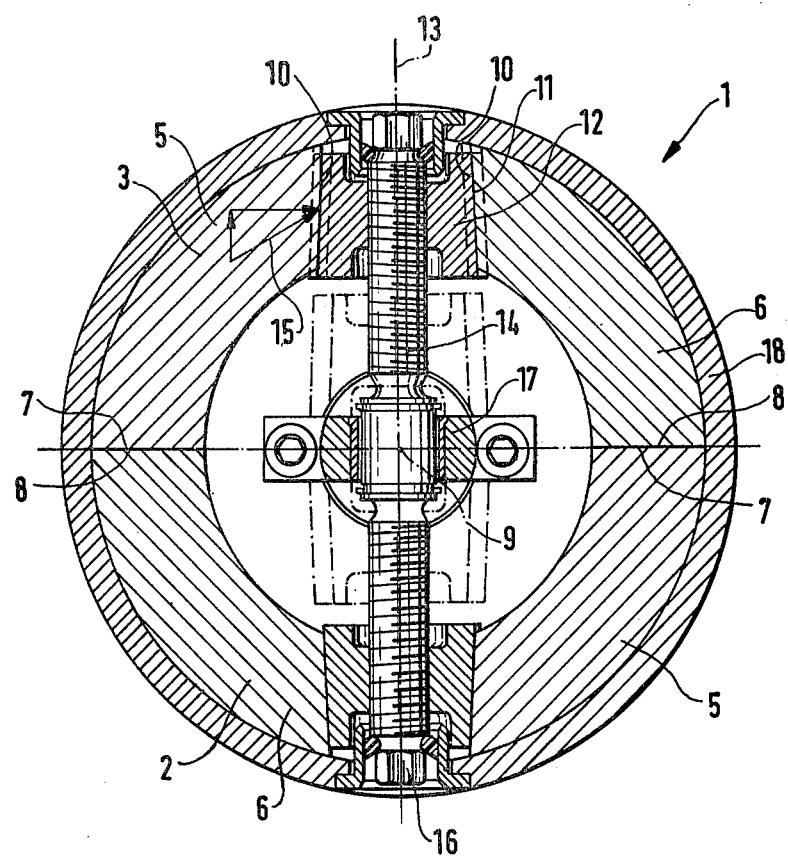
FIG. 2 is a sectional view taken along lines I—I of FIG. 1.

Referring now in more detail to the accompanying drawings, the quick release coupling 1 illustrated in FIGS. 1 and 2 includes a pair of annular coupling flanges 2 and 3 between which torque is to be transmitted. Each of the coupling flanges are intended to be connected to different rotating members so that torque may be transmitted from one member through the coupling to the other member. In FIG. 1, coupling flange 2 is shown as being connected with a wobbler element (shown in phantom dash dot lines) and coupling flange 3 is shown as being connected to a yoke 4 on one side of a universal joint (also shown in phantom dash dot lines). Each flange 2 and 3 is provided with two dogs or clutch elements 6 and 5 respectively, on a side facing the other coupling flange. Both clutch elements 6 and 5 respectively of each flange 2 and 3 engage each other for transmitting driving torque from one half of the coupling, or from one flange of the coupling, to the other. More particularly, torque will be transmitted from clutch elements 6 of flange 2 to clutch elements 5 of flange 3 through cooperating flat bearing surfaces 7 on clutch elements 6 and surfaces 8 on clutch elements 5. Cooperating bearing surfaces 7 and 8 extend in a plane which also passes through the axis of rotation of the coupling. Torque may obviously be transmitted in the reverse direction from flange 3 to flange 2 via coupling elements 5 and 6 through bearing surfaces 8 and 7 respectively.

A bearing face 10 is located at the arcuate end of each clutch element opposite the bearing surfaces 7 or 8. These bearing faces 10 serve to brace the two flanges of the coupling together as will be appreciated more fully hereinafter. A pair of tension shoes 12 are carried on a bolt 14 for radial displacement toward and away from each other when the bolt 14 is rotated. Each tension shoe 12 has a tension face 11 which cooperates with a bearing face 10 of one of the clutch elements. The tension face 11 of each tension shoe is spaced radially away from the longitudinal axis 13 of the bolt 14 by a distance which tends to be shorter toward the periphery of the coupling and longer toward the axis of rotation 9 of the coupling. As a result of this arrangement, the circumferentially acting torque transmitting forces are split into several components which act on the tension surface 11 of the tensioning shoes. This is in contrast to the forces which act between the bearing surfaces 7 and 8 of the clutch elements 6 and 5 respectively in which the circumferentially acting force acts at right angles to the opposite bearing face. The circumferentially acting force 15, illustrated diagramatically in FIG. 2, acting on the tension face 11, has two components extending at right angles with respect to each other. One component of resultant force 15 acts in a direction normal to the tension surface 11, and the other component acts in a direction radially outward of the flange tending to cause tension shoe 12 to move in a radially outward direction. This force thus opposes displacement which would produce disengagement. Radial displacement of tension shoes 12 along the threaded bolt 14, to actually brace the two coupling flanges together, is accomplished by rotational adjustment of the bolt from outside the coupling by means of the square or hexagonal bolt end 16.

Bolt 14 is mounted in the coupling on a guide 17. Because of the oppositely pitched screw threads extending in opposite directions from the center of the coupling, rotation of bolt 14 will cause the tension shoes 12 to be displaced along bolt 14 in opposite directions from each other. Flange 2 is provided with a centering ring 18 in order to facilitate easy assembly of the coupling flanges 2 and 3.

Coupling flange 2 is braced against axial displacement by engagement between its bearing face 10 of its clutch element 6 and the cooperating tension face 11 on tension shoe 12. This may be more fully appreciated from FIG. 3 which is a top plan view of the periphery of coupling 1 with portions broken away so that the cooperation between bearing face 10 and tension face 11 will be more fully appreciated. The opposite tension face 11 of tension shoe 12 engages with the corresponding bearing face 10 of flange 3. This coaction between the bearing faces 10 of the clutch elements on opposite coupling flanges and the tension shoe 12 produces a circumferential force to tension or brace the two halves of the coupling, or the coupling flanges, together. After assembly of the coupling flanges, bolt 14 may be rotated by means of the square, or hexagonal, end 16 in order to displace the tension shoes in a radially outward direction so that the coupling will be positively engaged. The circumferential force 15 which acts on tension face 11 of the tensioning shoe 12 will extend at an angle of less than 90° with respect to the axis of rotation of the coupling and will therefore be divided into two components. A first resultant force will be directed at right angles toward the face 11, and a component force will act in a direction tending to cause coupling flange 3 to be displaced toward coupling flange 2. This produces an axially directed force which opposes disengagement of the coupling flanges.

Figure 3:
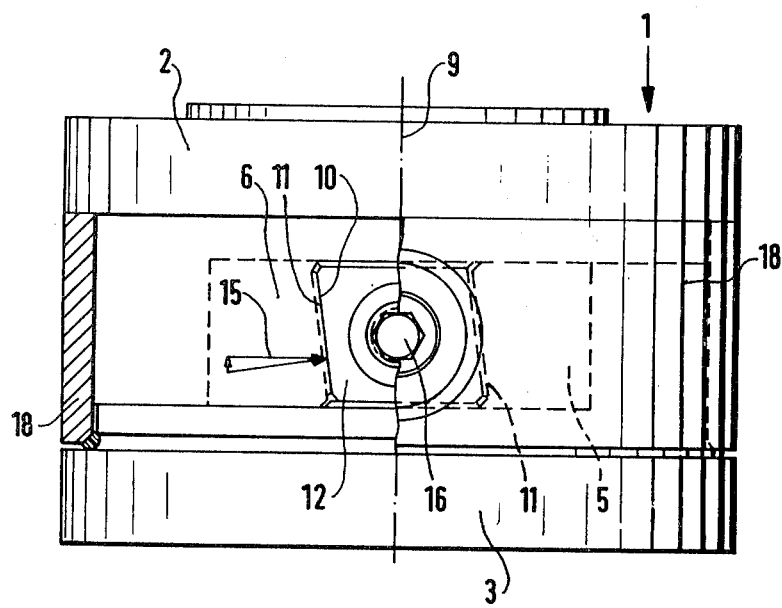
FIG. 3 is a top plan view of the coupling with portions broken away showing one embodiment of a tension shoe.
Figure 4:
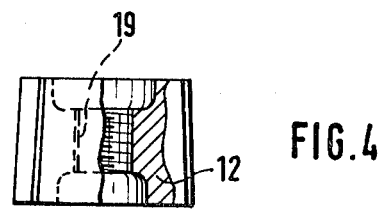
FIG. 4 is an elevational view, partly broken away, illustrating the tension shoe shown in FIG. 3.
Figure 5:
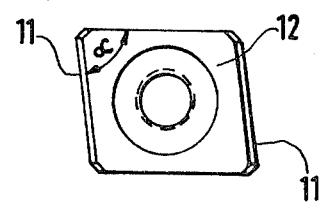
FIG. 5 is a plan view of the tension shoe shown in FIG. 3.

FIGS. 4 and 5 illustrate the tension shoe shown in FIG. 3 in greater detail. The tension shoe includes a bore 19 so that it may be carried on the bolt 14 and axially moved therealong by the screw thread. The tension faces 11 on opposite sides of the tension shoe 12 are tapered from one end of the shoe. As will be appreciated from FIG. 2, the tapered end of the shoe is remote from the axis of rotation 9. The two remaining faces of tension shoe 12 are parallel with each other, however, their particular configuration or position is immaterial since these faces do not cooperate with other elements of the coupling and perform no function. The angular position of tension faces 11 is illustrated in FIG. 5 which show that these faces include an angle α of less than 90° with respect to the adjacent and coacting face in the same flange.

Figure 6:
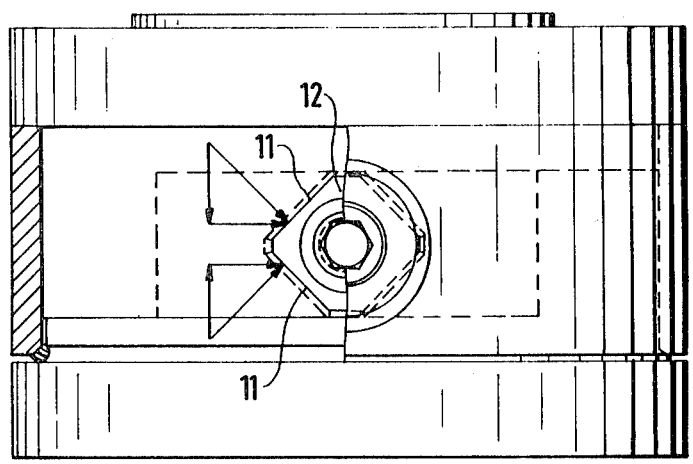
FIG. 6 is a view similar to that of FIG. 3 illustrating a tension shoe in accordance with another embodiment of the present invention.

FIG. 6 is another plan view of the peripheral surface of coupling 1 similar to the view shown in FIG. 3 but illustrating another embodiment of the tension shoe 12. In this embodiment, the outer configuration of tension shoe 12, when viewed from above, is square. As a result of this configuration, the circumferential force acting on tension shoe 12 from one of the coupling flanges will act on two adjacent tension faces 11 which are oppositely symmetrical. These forces will also produce a resultant force acting at right angles to each of the tension faces, and a component acting in an axial direction of the coupling. These axial forces, as diagrammatically indicated in FIG. 6, act in axially opposite directions thus cancelling each other out leaving only the circumferentially acting components to effect torque transmission. This arrangement is preferred in situations where it is desirable for the coupling to be totally free of any axially directed forces.

Figure 7:
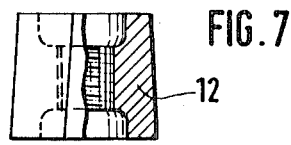
FIG. 7 is an elevational view, partly broken away, showing the tension shoe illustrated in FIG. 6.
Figure 8:
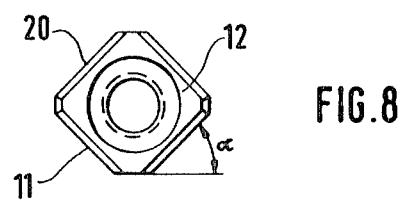
FIG. 8 is a plan view of the tension shoe illustrated in FIG. 6.

FIG. 7 and 8 are similar to FIGS. 4 and 5 but illustrate the tension shoe 12 shown in FIG. 6 in elevational and top plan views respectively. It will be clearly apparent that the cross sectional configuration of the tension shoe in these figures when seen in plan view is square. In this arrangement, the operative tension faces 11 are also provided with a radially outwardly directed taper from the side nearest the center axis. This produces a generally pyramidal structure of the tension shoe. It will also be seen that this pyramid is truncated. In all other respects, apart from this difference in outer contour, the remaining configuration of the tension shoe 12 shown in FIGS. 6 through 8 is essentially the same as the tension shoe 12 shown in FIGS. 3 through 5.

Figure 9:
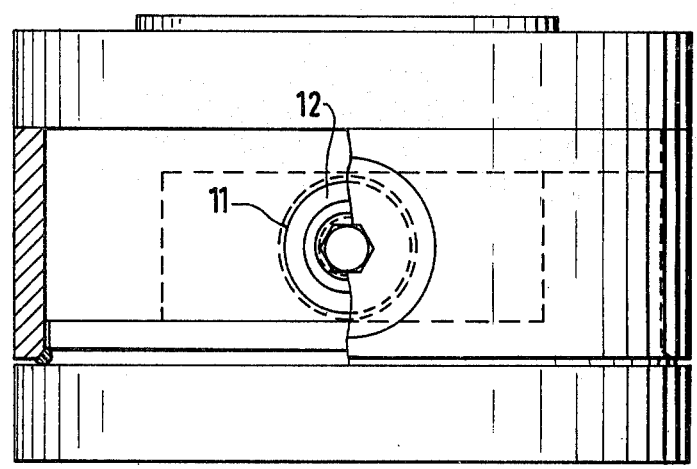
FIG. 9 is a view similar to that of FIG. 3 showing yet a further embodiment of the tension shoe.
Figure 10:
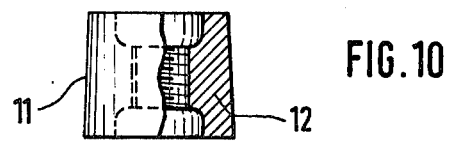
FIG. 10 is an elevational view, partly broken away, illustrating the tension shoe shown in FIG. 9.
Figure 11:
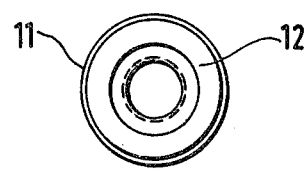
FIG. 11 is a plan view of the tension shoe shown in FIG. 9.

FIG. 9 illustrates yet a further embodiment of the present invention, which is similar to that shown in FIGS. 3 and 6, however, in this embodiment the tension shoe 12 is in the form of a truncated cone having conically tapered tension surfaces 11. The conical form of the outer surface of the tension shoe 12 shown in this embodiment achieves basically the same functional effect as that of the tension shoe 12 illustrated in FIGS. 7 and 8. The conical surfaces 11 of this embodiment will also cause the circumferential forces to have axially directed components which cancel each other out. A coupling employing tension shoes, as illustrated in FIGS. 9 through 11, will therefore also be free of all axial forces. FIGS. 10 and 11, which show the truncated conical tension shoe 12 in greater detail, clearly illustrate that tension faces 11 taper to one side. In other respects, however, the tension shoe 12, shown in FIGS. 10 and 11, is substantially the same as the tension shoe shown in FIGS. 4 and 5.

While the present invention has been described and illustrated with respect to certain preferred embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A quick release clutch coupling comprising a pair of annular coupling flanges concentric to a common axis and said coupling flanges being spaced apart along the common axis with a transverse surface on each said coupling flanges facing said transverse surface on the other, first and second axially extending clutch elements located on said transverse surface on each of said coupling flanges for rotationally coupling said coupling flanges together, said first and second clutch elements on each said coupling flanges being spaced circumferentially apart so that said clutch elements on one said coupling flange interfit between said clutch elements on the other said coupling flange, each of said first and second clutch elements having a first and a second radially and axially extending end bearing surface with the first and second surfaces spaced circumferentially apart, said first end bearing surfaces on said clutch elements of said flange being disposed in bearing contact with said first end bearing surfaces on said clutch elements of the other said flange, said first end bearing surfaces lying in a plane passing through the common axis of said coupling flanges surfaces on each of said clutch elements, the bearing surfaces on the clutch elements of one of said flanges being in direct engagement with the bearing surfaces of the clutch elements on the other coupling flange, said engaged bearing surfaces lying in a plane passing through the axis of rotation of said coupling, an axially elongated bolt extending transversely of the common axis of said coupling flanges between said transverse surfaces thereof in the space containing said clutch elements, said bolt intersecting the common axis and having oppositely pitched threads on opposite sides of said common axis mounted for rotational movement by a guide on said coupling, a pair of tension shoes carried on the opposite ends of said bolt for displacement in opposite radial directions relative to the common axis upon rotation of said bolt for selectively rotationally interengaging said coupling flanges, said second end bearing surface of each clutch element bearing against one of said tension shoes, the distance between said second end bearing surfaces on the opposite sides of each said tension shoe decreasing in the direction radially outwardly from the common axis of said coupling flanges.

2. The quick release clutch coupling according to claim 1 wherein said tension shoes transversely of the axis of said bolt have a parallelogram shaped cross sectional configuration, the side faces thereof which are engaged by said second end bearing surfaces extending in a direction at an angle which is less than 90° with respect to the common axis of said coupling flanges.

3. The quick release clutch coupling according to claim 1 wherein the surfaces of said tension shoes extending radially of the common axis of said coupling flanges have a pyramidal configuration, the side faces of the pyramidal surface include at least one side face which is inclined at an angle of less than 90° with respect to the common axis of said coupling flanges, and another side face which is oppositely symmetrical thereto.

4. The quick release clutch coupling according to claim 1 wherein each surface of said tension shoes extending in the direction radially of the common axis of said coupling flanges is engaged by said second end bearing surface.

5. The quick release clutch coupling according to claim 1 further wherein said bolt includes means accessible exteriorly of said coupling for causing rotation of said bolt about its axis.

* * * * *